United States Patent
Shibata et al.

(10) Patent No.: US 10,136,471 B2
(45) Date of Patent: Nov. 20, 2018

(54) COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD EXECUTED BY COMMUNICATION DEVICE

(71) Applicant: Brother Kogyo Kabushiki Kaisha, Nagoya-shi, Aichi-ken (JP)

(72) Inventors: Hiroshi Shibata, Obu (JP); Hirotaka Asakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/854,374

(22) Filed: Dec. 26, 2017

(65) Prior Publication Data
US 2018/0184485 A1    Jun. 28, 2018

(30) Foreign Application Priority Data
Dec. 28, 2016 (JP) .................... 2016-256007

(51) Int. Cl.
*H04W 76/10* (2018.01)
*H04W 88/10* (2009.01)
(Continued)

(52) U.S. Cl.
CPC ........... *H04W 88/10* (2013.01); *H04W 76/14* (2018.02); *H04W 76/16* (2018.02); *H04W 76/36* (2018.02);
(Continued)

(58) Field of Classification Search
CPC ..... H04W 76/10; H04W 76/14; H04W 88/06; H04W 88/02; H04W 76/16; H04W 76/15; H04W 84/20; H04W 88/08; H04W 92/10
(Continued)

(56) References Cited

U.S. PATENT DOCUMENTS

2012/0069772 A1* 3/2012 Byrne ................... H04W 88/06
370/255
2013/0260818 A1 10/2013 Suzuki et al.
(Continued)

FOREIGN PATENT DOCUMENTS

JP    2013214803 A    10/2013
JP    2015142163 A    8/2015

OTHER PUBLICATIONS

Wi-Fi Alliance, "Wi-Fi Peer-to Peer (P2P) Technical Specification", Version 1.5, pp. 1-183, 2014.

*Primary Examiner* — Keith Ferguson
(74) *Attorney, Agent, or Firm* — Banner & Witcoff, Ltd.

(57) ABSTRACT

A communication device may shift an operation state of the communication device from a parent station state for operating as a parent station of a first wireless network to a specific state different from the parent station state, in a case where a predetermined communication with an external device not belonging to the first wireless network is executed under a first state where the communication device is operating as the parent station of the first wireless network; and after the operation state of the communication device has been shifted to the specific state, establish a first wireless connection with the external device operating as a parent station of a second wireless network via a first wireless interface of the communication device, so as to cause the communication device to participate in the second wireless network as a child station.

13 Claims, 9 Drawing Sheets

(51) Int. Cl.
*H04W 76/14* (2018.01)
*H04W 76/16* (2018.01)
*H04W 76/36* (2018.01)
*H04W 88/08* (2009.01)
*H04W 88/06* (2009.01)
*H04W 88/04* (2009.01)

(52) U.S. Cl.
CPC ......... *H04W 88/06* (2013.01); *H04W 88/085* (2013.01); *H04W 88/04* (2013.01)

(58) Field of Classification Search
USPC .... 455/552.1, 41.1, 41.2, 41.3, 550.1, 67.11, 455/422.1, 403, 425, 566, 575.1, 556.1, 455/410, 411; 370/310, 252
See application file for complete search history.

(56) References Cited

U.S. PATENT DOCUMENTS

2015/0215973 A1   7/2015   Nguyenvan
2016/0316511 A1   10/2016  Suzuki et al.

* cited by examiner

FIG. 1
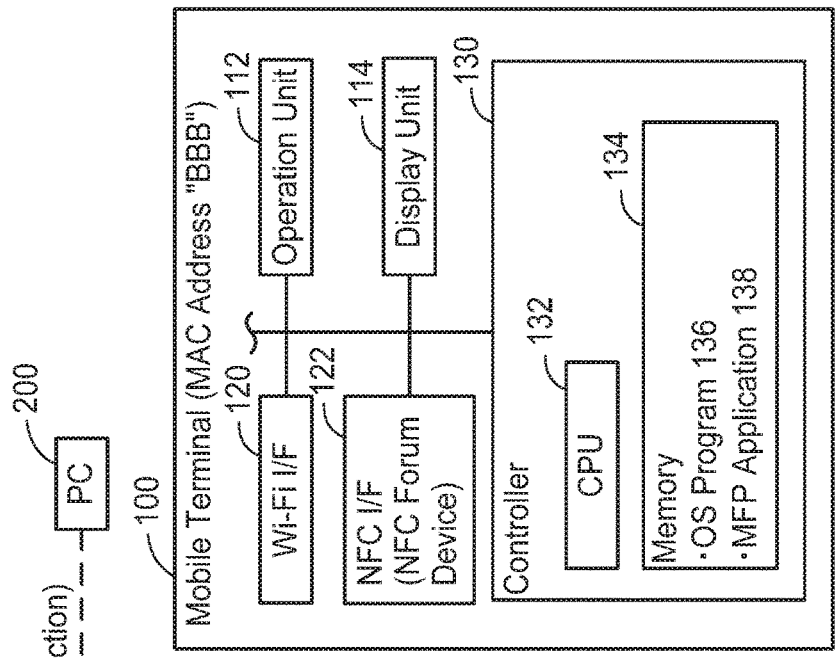
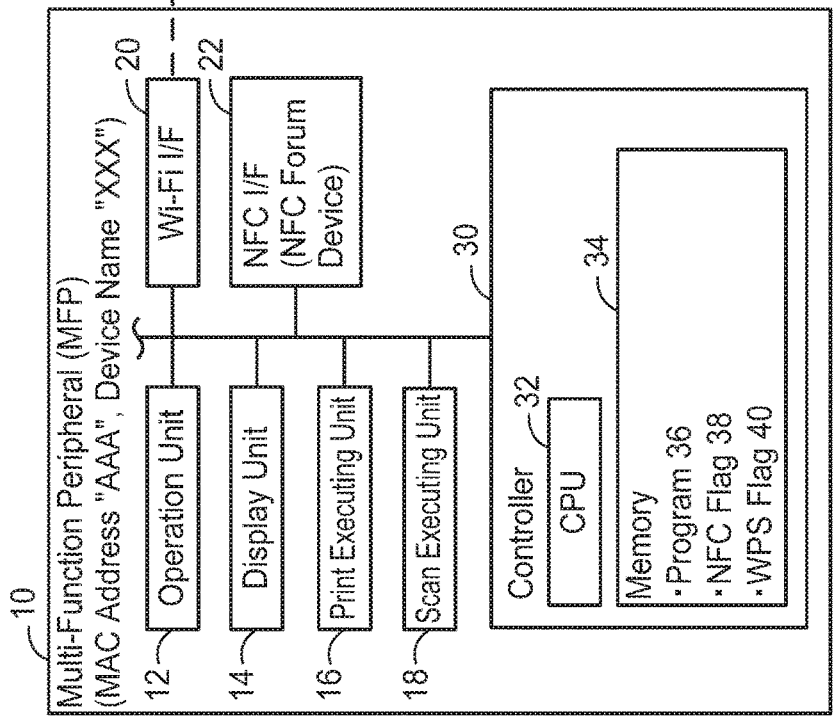

FIG. 8 (Case B)

COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD EXECUTED BY COMMUNICATION DEVICE

TECHNICAL FIELD

In the present disclosure, a technique for causing a communication device and an external device to belong to a same wireless network is disclosed.

BACKGROUND ART

A communication system including an MFP and a mobile terminal is known. In a case of receiving NFC information from the mobile terminal, the MFP sends, to the mobile terminal, a wireless setting to be used in a wireless network in which the MFP operates as a parent station. Thereby, by using the wireless setting, the mobile terminal can establish a wireless connection with the MFP, and participate in the wireless network as a child station.

SUMMARY

The present disclosure provides a novel technique for causing a communication device and an external device to belong to the same wireless network in a state where the communication device is operating as a parent station.

A communication device disclosed herein may comprise a first wireless interface; a processor, and a memory storing computer-readable instructions therein, the computer-readable instructions, when executed by the processor, causing the communication device to: shift an operation state of the communication device from a parent station state for operating as a parent station of a first wireless network to a specific state different from the parent station state, in a case where a predetermined communication with an external device not belonging to the first wireless network is executed under a first state where the communication device is operating as the parent station of the first wireless network; and after the operation state of the communication device has been shifted to the specific state, establish a first wireless connection with the external device operating as a parent station of a second wireless network via the first wireless interface, so as to cause the communication device to participate in the second wireless network as a child station.

A control method, computer-readable instructions, and a non-transitory computer-readable recording medium in which the computer-readable instructions are stored for implementation of the communication device described above, are also novel and useful. Moreover, a communication system comprising the above-described communication device and external device is also novel and useful.

BRIEF DESCRIPTION OF THE DRAWINGS

FIG. 1 shows a configuration of a communication system.

EMBODIMENTS

Figure 2:
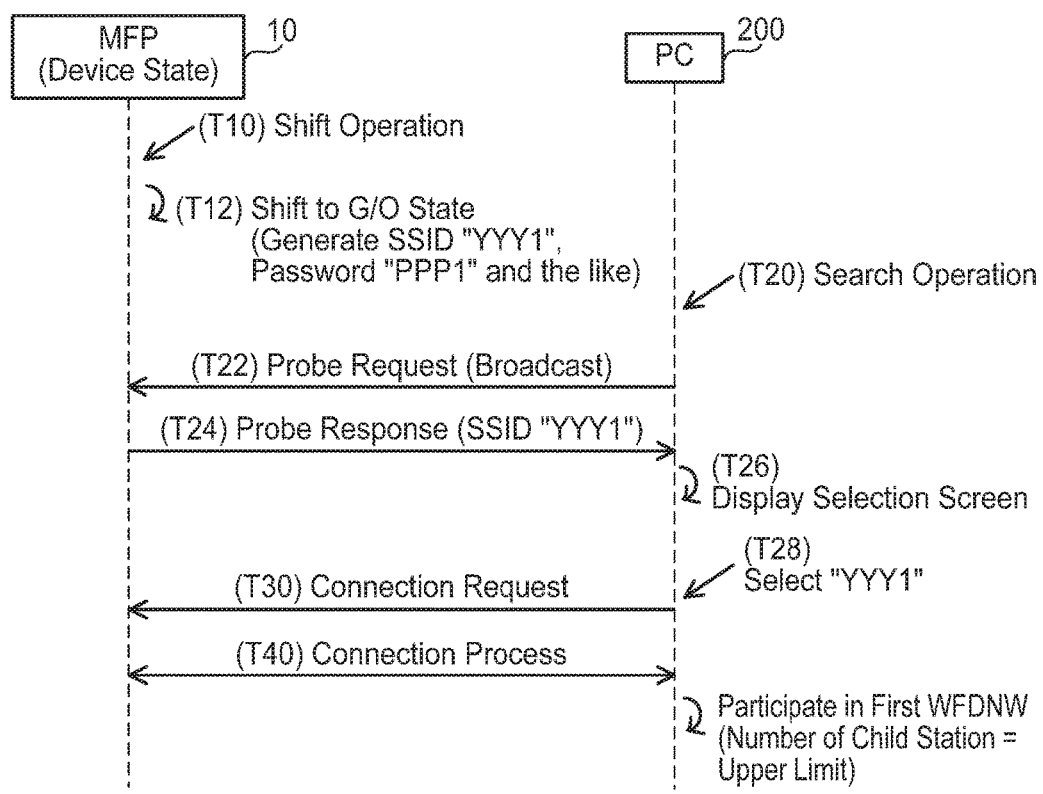
FIG. 2 shows a sequence in which a Wi-Fi connection is established between an MFP and a PC.

First Embodiment (Configuration of Communication System 2; FIG. 1)

As shown in FIG. 1, a communication system 2 comprises a multi-function peripheral 10 (called "MFP" below) and a mobile terminal 100. The MFP 10 and the mobile terminal 100 are capable of mutually executing a Wi-Fi communication, which is a wireless communication according to Wi-Fi scheme, and mutually executing an NFC (abbreviation of Near Field Communication) communication, which is a wireless communication according to NFC scheme.

(Configuration of MFP 10)

The MFP 10 is a peripheral device (e.g., a peripheral device of a PC 200, etc.) capable of executing multiple functions including a print function and a scan function. A MAC address "AAA" and a device name "XXX" are allocated to the MFP 10. The MFP 10 comprises an operation unit 12, a display unit 14, a print executing unit 16, a scan executing unit 18, a Wi-Fi interface (interface is denoted as "I/F" below) 20, an NFC I/F 22, and a controller 30.

The operation unit 12 comprises a plurality of keys. A user can input various instructions to the MFP 10 by operating the operation unit 12. The display unit 14 is a display for displaying various information. The display unit 14 also functions as a so-called touch panel. That is, the display unit 14 also functions as an operation unit. Below, the operation unit 12 and the display unit 14 may collectively be referred to as "MFP operation unit". The print executing unit 16 is a printing mechanism such as an ink jet scheme, laser scheme, etc. The scan executing unit 18 is a scanning mechanism such as CCD, CIS, etc.

The Wi-Fi I/F 20 is an I/F for executing a Wi-Fi communication according to the Wi-Fi scheme. The Wi-Fi scheme is a wireless communication scheme based on, for example, the standard of IEEE (abbreviation of The Institute of Electrical and Electronics Engineers, Inc.) 802.11 and standards conforming thereto (e.g., 802.11a, 11b, 11g, 11n, etc.). The Wi-Fi I/F 20 supports, in particular, WFD (abbreviation of Wi-Fi Direct (registered trademark)) scheme developed by the Wi-Fi Alliance. The WFD scheme is a wireless communication scheme described in the standard document "Wi-Fi Peer-to-Peer (P2P) Technical Specification Version 1.5" created by the Wi-Fi Alliance.

The MFP 10 can operate in any state of Group Owner state, Client state, and device state according to the WFD scheme. Below, Group Owner and Client are referred to as "G/O" and "CL", respectively. In a case of the MFP 10 operating in the G/O state, the MFP 10 forms a WFD network (referred to as "WFDNW" below) in which the MFP 10 operates as a parent station (i.e., as G/O). Then, the MFP 10 establishes a Wi-Fi connection with an external device, and allows the external device to participate in the WFDNW as a child station. For example, in a case where the external device is a device supporting the WFD scheme (referred to as "WFD device" below), the external device operates in the CL state, and participates in the WFDNW as a child station (i.e., as CL). Further, for example, in a case where the external device does not support the WFD scheme, that is, in a case where the external device is a legacy device, the external device participates in the WFDNW as a child station (i.e., as legacy) without operating in any of the states of the WFD scheme. There is a predetermined upper limit for a number of child stations that can participate in the WFDNW in which the MFP 10 operates as the parent station, and in the present embodiment, the upper limit is "1". It should be noted, in a modification, the upper limit may be "2" or more. Further, in a case where the external device operates in the G/O state, the MFP 10 operates in the CL state. In that case, the MFP 10 establishes a Wi-Fi connection with the external device, and can participate in the WFDNW formed by the external device as a child station (i.e., as CL). It should be noted that the device state is a state that is neither the G/O state nor the CL state, that is, the device state is a state in which the MFP 10 is not establishing a connection with the external device.

Further, the Wi-Fi I/F 20 supports WPS (abbreviation of Wi-Fi Protected Setup) formulated by the Wi-Fi Alliance. The WPS is a so-called automatic wireless setting or easy wireless setting, and is a technology capable of easily establishing a wireless connection according to the Wi-Fi scheme (called "Wi-Fi connection" below) between a pair of devices without a user inputting wireless setting information (e.g., password, authentication scheme, encryption scheme, etc.) for establishing the Wi-Fi connection. In particular, the Wi-Fi I/F 20 supports PBC (abbreviation of Push Button Configuration) scheme of the WPS. The PBC scheme is a scheme for establishing a Wi-Fi connection between a pair of devices in a case where a user executes a wireless connection operation (e.g., an operation of pushing button) on each of the pair of devices.

The NFC I/F 22 is an I/F for executing an NFC communication according to the NFC (abbreviation of Near Field Communication) scheme. The NFC scheme is a wireless communication scheme based on international standards such as ISO/IEC14443, 15693, 18092. It should be noted that an I/F called an NFC forum device, and an I/F called an NFC forum tag are known as types of I/F for executing an NFC communication. The NFC I/F 22 is an NFC forum device, and is capable of selectively operating in any of P2P (abbreviation of Peer To Peer) mode, R/W (abbreviation of Reader/Writer) mode, and CE (abbreviation of Card Emulation) mode.

Next, differences between the Wi-Fi I/F 20 and the NFC I/F 22 will be described. A communication speed of a Wi-Fi communication via the Wi-Fi I/F 20 (e.g., maximum communication speed is 11 to 600 Mbps) is faster than a communication speed of an NFC communication via the NFC I/F 22 (e.g., maximum communication speed is 100 to 424 Kbps). Further, a frequency of a carrier wave in a Wi-Fi communication via the Wi-Fi I/F 20 (e.g. 2.4 GHz band or 5.0 GHz band) is different from a frequency of a carrier wave in an NFC communication via the NFC I/F 22 (e.g. 13.56 MHz band). Further, a maximum distance with which a Wi-Fi communication via the Wi-Fi I/F 20 can be executed (e.g., approximately 100 m at maximum) is greater than a maximum distance with which an NFC communication via the NFC I/F 22 can be executed (e.g., approximately 10 cm at maximum).

The controller 30 comprises a CPU 32 and a memory 34. The CPU 32 executes various processes in accordance with a program 36 stored in the memory 34. The memory 34 is constituted of a volatile memory, a non-volatile memory, etc. Further, the memory 34 stores an NFC flag 38 and a WPS flag 40.

The NFC flag 38 indicates one of "ON", which means that an NFC link has been established, and "OFF", which means that an NFC link is not being established.

The WPS flag 40 is set to one of "ON", which means that the MFP 10 can execute a WPS process, and "OFF", which means that the MFP 10 cannot execute the WPS process. Here, the WPS process includes a communication of wireless setting information for establishing a Wi-Fi connection. A state in which the WPS flag 40 is set to "ON" is equal to a state in which the push button operation of the PBC scheme has been executed.

(Configuration of Mobile Terminal 100)

The mobile terminal 100 is a portable terminal device such as a mobile telephone, a smartphone, a PDA, a notebook PC, a tablet PC, a portable music playback device or a portable movie playback device. A MAC address "BBB" is allocated to the mobile terminal 100. The mobile terminal 100 comprises an operation unit 112, a display unit 114, a Wi-Fi I/F 120, an NFC I/F 122, and a controller 130.

The operation unit 112 comprises a plurality of keys. The user can input various instructions to the mobile terminal 100 by operating the operation unit 112. The display unit 114 is a display for displaying various information. The display unit 114 also functions as a so-called touch panel. That is, the display unit 114 also functions as an operation unit. Below, the operation unit 112 and the display unit 114 may collectively be termed "terminal operation unit". The Wi-Fi I/F 120 and the NFC I/F 122 are the same as the Wi-Fi I/F 20 and the NFC I/F 22 of the MFP 10, respectively.

The controller 130 comprises a CPU 132 and a memory 134. The CPU 132 executes various processes in accordance with an OS (abbreviation of Operating System) program 136 stored in the memory 134. The OS program 136 is a program for controlling various basic operations of the mobile terminal 100. Further, the memory 134 stores an MFP application 138. The MFP application 138 is an application provided by a vendor of the MFP 10, and is installed in the mobile terminal 100 from, for example, a server on the Internet. The MFP application 138 is an application for establishing a Wi-Fi connection between the mobile terminal 100 and the MFP 10, and executing a communication of target data (e.g., print data, scan data) by using the Wi-Fi connection between the mobile terminal 100 and the MFP 10. Below, the MFP application 138 is simply called "application 138".

(Establishment of Wi-Fi Connection Between MFP 10 and PC 200; FIG. 2)

Next, a manner of establishing a Wi-Fi connection between the MFP 10 and the PC 200, which is a legacy device, will be described with reference to FIG. 2. In an initial state of FIG. 2, the MFP 10 is operating in the device state.

Upon a shift operation being executed by the user in the MFP operation unit in T10, the MFP 10 shifts in T12 from the device state to the G/O state. Thereby, the MFP 10 generates first wireless setting information (i.e., an SSID "YYY1", a password "PPP1", etc.) to be used in a first WFDNW in which the MFP 10 operates as a parent station (i.e., as G/O). In this state, the number of child stations participating in the first WFDNW is "0".

Upon a search operation being executed by the user in T20, the PC 200 sends a Probe request by broadcast in T22.

Upon receiving the Probe request from the PC 200 in T22, the MFP 10 sends a Probe response including the SSID "YYY1" to the PC 200 in T24.

Upon receiving the Probe response from the MFP 10 in 124, the PC 200 displays a selection screen including the SSID "YYY1" included in the Probe response in T26, and accepts selection of the SSID "YYY1" in T28. Then, in T30, the PC 200 sends a connection request to the MFP 10.

Upon receiving the connection request from the PC 200 in T30, the MFP 10 executes various communications for establishing a Wi-Fi connection with the PC 200 in T40. Thereby, the MFP 10 can establish a Wi-Fi connection with the PC 200, and cause the PC 200 to participate in the first WFDNW as a child station (i.e., as legacy). As a result, the number of child stations participating in the first WFDNW reaches the upper limit "1".

Figure 3:
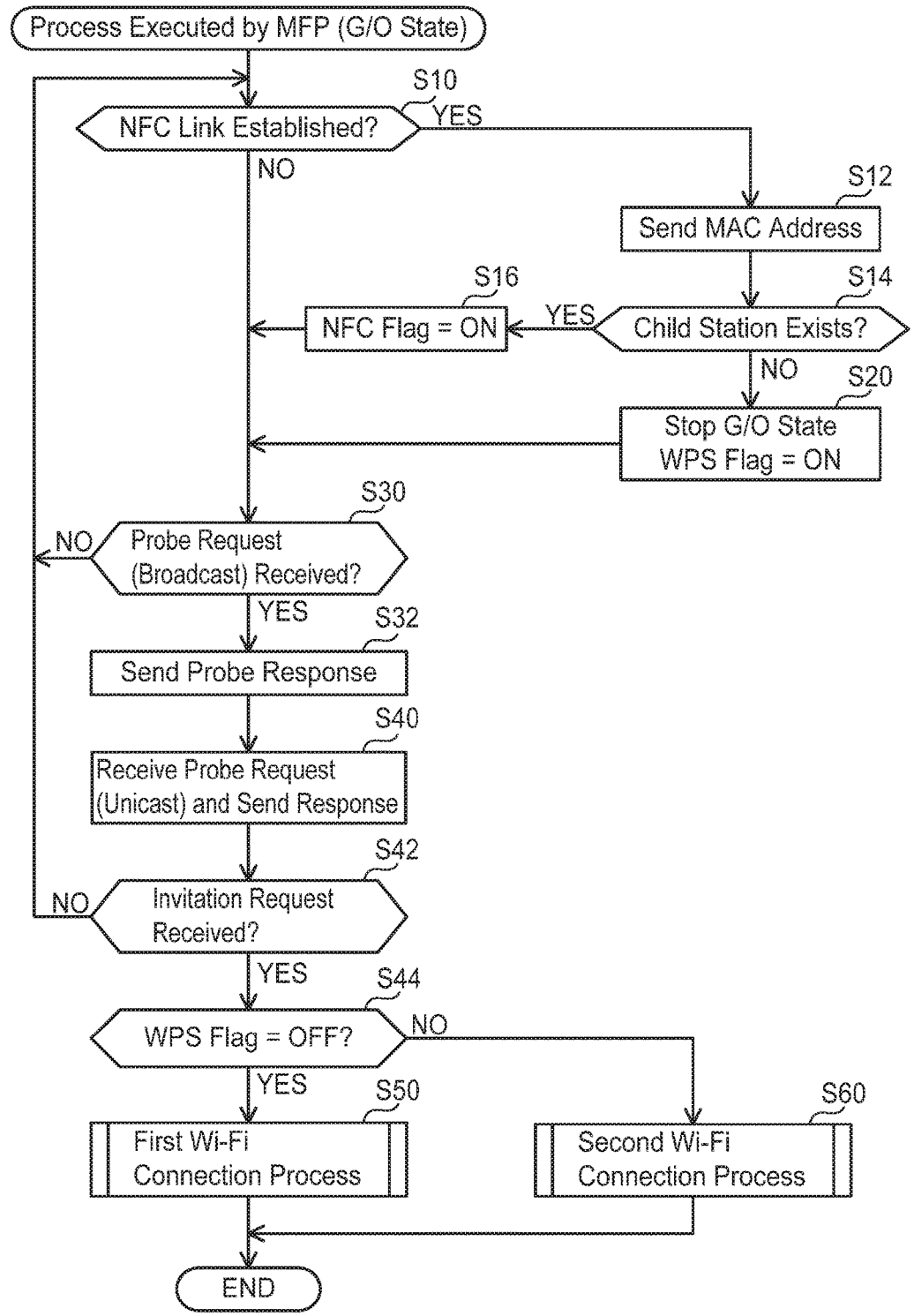
FIG. 3 shows a flowchart of a process executed by the MFP.

(Process Executed by MFP 10; FIG. 3)

Next, contents of a process executed by the CPU 32 of the MFP 10 in accordance with the program 36 will be described with reference to FIG. 3. When the MFP 10 shifts to the G/O state (see T12 of FIG. 2), the process of FIG. 3 is started.

In S10, the CPU 32 monitors whether an NFC link is established between the MFP 10 and the mobile terminal 100. When the user brings the mobile terminal 100 closer to the MFP 10, a distance between the NFC I/F 122 of the mobile terminal 100 and the NFC I/F 22 of the MFP 10 becomes shorter than the maximum distance with which an NFC link can be established (e.g., 10 cm). As a result, an NFC link between the MFP 10 and the mobile terminal 100 is established. In a case of acquiring establishment information indicating that the NFC link has been established from the NFC I/F 22, the CPU 32 determines YES in S10, and proceeds to S12.

In S12, the CPU 32 sends the MAC address "AAA" of the MFP 10 to the mobile terminal 100 by using the established NFC link (i.e., via the NFC I/F 22).

In S14, the CPU 32 determines whether a child station is participating in the first WFDNW in which the MFP 10 operates as the parent station. In a case of determining that a child station is participating in the first WFDNW (YES in S14), in S16, the CPU 32 changes the NFC flag 38 from "OFF" to "ON". When S16 ends, the CPU 32 proceeds to S30. On the other hand, in a case of determining that a child station is not participating in the first WFDNW (NO in S14), the CPU 32 proceeds to S20.

In S20, the CPU 32 stops the G/O state, and shifts the MFP 10 from the G/O state to the device state. Thereby, the first WFDNW disappears. In S20, the CPU 32 further changes the WPS flag 40 from "OFF" to "ON". Thereby, the MFP 10 shifts to the state where the push button operation of the PBC scheme has been executed, that is, a state where the WPS process is executable. When S20 ends, the CPU 32 proceeds to S30.

As described above, in the case where a child station is not participating in the first WFDNW in which the MFP 10 operates as the parent station (NO in S14), the MFP 10 stops the G/O state (S20) before receiving an Invitation request from the mobile terminal 100 (i.e., before S42). Thereby, it is possible to suppress a Wi-Fi connection from being established between the MFP 10 and a device different from the mobile terminal 100 in the time period between the establishment of the NFC link with the mobile terminal 100 and the reception of the Invitation request. Therefore, the MFP 10 can appropriately establish a Wi-Fi connection with the mobile terminal 100. On the other hand, the MFP 10 does not stop the G/O state in the case where a child station is participating in the first WFDNW in which the MFP 10 operates as the parent station (YES in S14). Thereby, the MFP 10 can continue the Wi-Fi communication with the child station.

In S30, the CPU 32 monitors whether a Probe request is received from the mobile terminal 100 via the Wi-Fi I/F 20. The Probe request is a signal sent by broadcast from the mobile terminal 100 (i.e., a signal whose destination is not specified), and is a signal for searching for a device capable of establishing a Wi-Fi connection. Upon receiving the Probe request (YES in S30), in S32, the CPU 32 sends a Probe response including the MAC address "AAA" to the mobile terminal 100 via the Wi-Fi I/F 20. The Probe response further includes the device name "XXX" in the case where the MFP 10 is operating in the device state (see S20), or further includes the SSID "YYY1" in the case where the MFP 10 is operating in the G/O state.

In S40, the CPU 32 receives a Probe request from the mobile terminal 100 via the Wi-Fi I/F 20. The Probe request includes the MAC address "AAA" of the MFP 10. That is, the Probe request is a signal sent by unicast from the mobile terminal 100 (i.e., a signal whose destination is specified), and is a signal for requesting the MFP 10 to establish a Wi-Fi connection. Upon receiving the Probe request, the CPU 32 sends a Probe response including the MAC address "AAA" to the mobile terminal 100 via the Wi-Fi I/F 20. Thereby, the MFP 10 can inform the mobile terminal 100 that a Wi-Fi connection can be established with the MFP 10.

In S42, the CPU 32 determines whether an Invitation request including a Persistent flag is received from the mobile terminal 100 via the Wi-Fi I/F 20. The Invitation request is a command for requesting participation in a second WFDNW in which the mobile terminal 100 operates as a parent station (i.e., as G/O). The Persistent flag is set to either of "ON" for requesting establishment of a Wi-Fi connection by using Persistent information without executing the WPS process, or "OFF" for requesting establishment of a Wi-Fi connection by executing the WPS process. The Persistent information is wireless setting information which was used in the past for establishing a Wi-Fi connection between the MFP 10 and the mobile terminal 100, that is, the Persistent information is wireless setting information which was used in a WFDNW formed by the mobile terminal 100 in the past. For example, if the MFP 10 has a record of having participated in the second WFDNW formed by the mobile terminal 100, the memory 34 of the MFP 10 is storing Persistent information including the MAC address "BBB" of the mobile terminal 100, an SSID "YYY2" of the second WFDNW, and a password "PPP2" used in the second WFDNW. The CPU 32 proceeds to S44 in a case of receiving the Invitation request (YES in S42), or proceeds to S10 in a case of not receiving the Invitation request (NO in S42).

In S44, the CPU 32 determines whether the WPS flag 40 indicates "OFF". In a case where the WPS flag 40 indicates "OFF" (YES in S44), in S50, the CPU 32 executes a first Wi-Fi connection process (see FIG. 4) for establishing a Wi-Fi connection with the mobile terminal 100. The first Wi-Fi connection process is a process executed in a situation where the MFP 10 is in the G/O state. On the other hand, in a case where the WPS flag 40 indicates "ON" (NO in S44), in S60, the CPU 32 executes a second Wi-Fi connection process (see FIG. 5) for establishing a Wi-Fi connection with the mobile terminal 100. The second Wi-Fi connection process is a process executed in a situation where the MFP 10 is in the device state (see S20). When S50 or S60 ends, the process of FIG. 3 ends.

Figure 4:
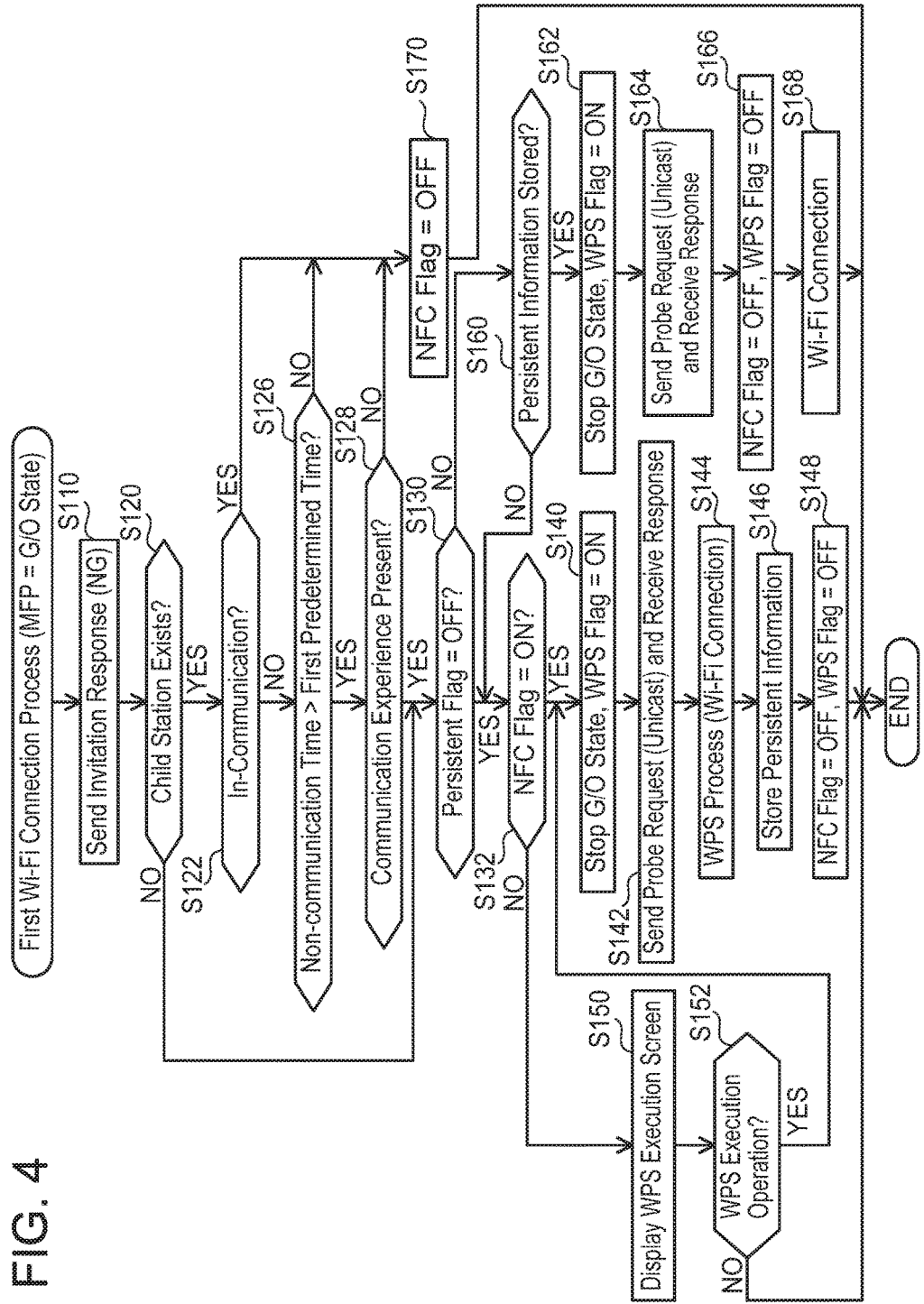
FIG. 4 shows a flowchart of a first Wi-Fi connection process.

(First Wi-Fi Connection Process; FIG. 4)

Next, the first Wi-Fi connection process executed in S50 of FIG. 3 in the situation where the MFP 10 is in the G/O state will be described with reference to FIG. 4. It should be noted that all communications executed in FIG. 4 are via the Wi-Fi I/F 20. Therefore, in the description below, the explanation of "via the Wi-Fi I/F 20" is omitted. This is also applied to the description of FIG. 5.

In S110, the CPU 32 sends, to the mobile terminal 100, an Invitation response including NG information indicating that the WPS process is inexecutable.

S120 is the same as S14 of FIG. 3. The CPU 32 proceeds to S122 in the case of determining that a child station is participating in the first WFDNW (YES in S120), or skips S122 to S128, and proceeds to S130 in the case of determining that a child station is not participating in the first WFDNW (NO in S120). It should be noted that a situation in which the determination of NO is made in S120 after the determination of YES was made in S14 of FIG. 3 occurs, for example, in a case when the child station which was present at the time of S14 of FIG. 3 left the first WFDNW before the execution of S120.

The processes of S122 to S128 will be described taking, as an example, a case in which the PC 200 is participating in the first WFDNW as a child station (i.e., as legacy). In S122, the CPU 32 determines whether a Wi-Fi communication with the PC 200 is being executed. In a case where the CPU 32 is executing, with the PC 200, a TCP/IP communication using an upper layer than the data link layer of the OSI reference model (i.e., network layer, transport layer, session layer, presentation layer, application layer), the CPU 32 determines that a Wi-Fi communication with the PC 200 is being executed (YES in S122), changes the NFC flag 38 from "ON" to "OFF" in S170, and ends the process of FIG. 4 without establishing a Wi-Fi connection with the mobile terminal 100. For example, the determination of YES is made in S122 in a case of receiving print data representing an image of a print target from the PC 200, or in a case of sending scan data generated by scan to the PC 200. On the other hand, in a case of not executing a TCP/IP communication with the PC 200, the CPU 32 determines that a Wi-Fi communication with the PC 200 is not being executed (NO in S122), and proceeds to S126. Accordingly, even if a communication using only a layer lower than the data link layer (e.g., communication of a beacon signal) is being executed with the PC 200, the CPU 32 determines that a Wi-Fi communication with the PC 200 is not being executed.

In S126, the CPU 32 determines whether a time during which a Wi-Fi communication with the PC 200 is not executed (called "non-communication time" below) is greater than a first predetermined time. The non-communication time is a time that has elapsed since a last Wi-Fi communication with the PC 200 was completed. In a case of determining that the non-communication time is equal to or shorter than the first predetermined time (NO in S126), the CPU 32 proceeds to S170, and ends the process of FIG. 4 without establishing a Wi-Fi connection with the mobile terminal 100. For example, a Wi-Fi communication between the MFP 10 and the PC 200 may be executed intermittently, such as in a situation where the PC 200 using a remote UI (abbreviation of User Interface) is accessing the MFP 10. In such a situation, if the Wi-Fi connection with the PC 200 is disconnected, an operation desired by the user may not be executed in the MFP 10. In order to suppress occurrence of such an event, a configuration is adopted which does not disconnect the Wi-Fi connection with the PC 200 in the case of determining that the non-communication time is equal to or shorter than the first predetermined time (NO in S126).

Here, the remote UI application will be described. The remote UI application is an application for executing, on the PC 200, the same operation as an operation executed on the MFP operation unit. When the remote UI application is activated, a screen which is same as a screen displayed on the display unit 14 of MFP 10 is displayed on the PC 200. When a button on the screen is operated in this state, the PC 200 sends information indicating that the button has been operated to the MFP 10 by using the Wi-Fi connection. As a result, the MFP 10 executes the function allocated to the button. As such, in the situation where the remote UI application is activated in the PC 200, information indicating the button operation may be intermittently sent to the MFP 10 from the PC 200.

On the other hand, in a case of determining that the non-communication time is longer than the first predetermined time (YES in S126), the CPU 32 proceeds to S128. In S128, the CPU 32 determines whether there is a communication experience with the PC 200. In a case where a Wi-Fi communication with the PC 200 has been executed once or more times after the PC 200 participated in the first WFDNW, the CPU 32 determines that there is a communication experience with the PC 200 (YES in S128), and proceeds to S130. On the other hand, in a case where a Wi-Fi communication with the PC 200 has not yet been executed, the CPU 32 determines that there is no communication experience with the PC 200 (NO in S128), proceeds to S170, and ends the process of FIG. 4 without establishing a Wi-Fi connection with the mobile terminal 100. The user of the PC 200 desires to execute some Wi-Fi communication between the MFP 10 and the PC 200 after the Wi-Fi connection with the MFP 10 has been established. Accordingly, there is a high probability of the user executing an operation for executing a Wi-Fi communication on the PC 200 in a situation where there is no communication experience with the PC 200. If the Wi-Fi connection with the PC 200 is disconnected in such a situation, the Wi-Fi communication desired by the user cannot be executed. In order to suppress occurrence of such an event, a configuration is adopted which does not disconnect the Wi-Fi connection with the PC 200 in the case of determining that there is no communication experience with the PC 200 (NO in S128).

In S130, the CPU 32 determines whether the Persistent flag in the Invitation request received in S42 of FIG. 3 indicates "OFF". The CPU 32 proceeds to S132 in a case where the flag indicates "OFF" (YES in S130), or proceeds to S160 in a case where the flag indicates "ON" (NO in S130). It should be noted, below, the Invitation request including the Persistent flag indicating "ON (or OFF)" is referred to as "Invitation request (ON (or OFF))".

In S132, the CPU 32 determines whether the NFC flag 38 is "ON". The CPU 32 proceeds to S140 in a case where the flag 38 is "ON" (YES in S132), or proceeds to S150 in a case where the flag 38 is "OFF" (NO in S132).

S140 is the same as S20 of FIG. 3. Thereby, the Wi-Fi connection between the MFP 10 and the PC 200 is disconnected.

In S142, the CPU 32 sends a Probe request including the MAC address "BBB" of the mobile terminal 100 to the mobile terminal 100. It should be noted that the MAC address "BBB" is included in the Invitation request received in S42 of FIG. 3. In S142, the CPU 32 further receives a Probe response including the MAC address "BBB" from the mobile terminal 100 in response to sending the Probe request.

In S144, the CPU 32 executes the WPS process. The WPS process includes a process of receiving wireless setting information for establishing a Wi-Fi connection with the mobile terminal 100. Accordingly, the CPU 32 receives, from the mobile terminal 100, second wireless setting information including the MAC address "BBB" of the mobile terminal 100, the SSID "YYY2" of the second WFDNW formed by the mobile terminal 100, and the password "PPP2" of the WFDNW. The CPU 32 further shifts the MFP 10 from the device state to the CL state, and establishes a Wi-Fi connection with the mobile terminal 100 by using the second wireless setting information. Thereby, the MFP 10 can participate, as a child station (i.e., as CL), in the second WFDNW in which the mobile terminal 100 operates as the parent station (i.e., as G/O).

In S146, the CPU 32 stores the second wireless setting information received in S144 in the memory 34 as Persistent information.

In S148, the CPU 32 changes the NFC flag 38 and the WPS flag 40 from "ON" to "OFF". Thereby, the MFP 10 shifts to a state where the WPS process is inexecutable.

Although not shown, when S148 ends, the CPU 32 can execute communications of various data with the mobile terminal 100 by using the Wi-Fi connection established in S144 (i.e., by using the second WFDNW). For example, the CPU 32 receives a function information request from the mobile terminal 100, and sends a function information response to the mobile terminal 100. The function information response includes information indicating that the MFP 10 is capable of executing the print function and the scan function. Thereby, the mobile terminal 100 can know the capability of the MFP 10. Further, for example, the CPU 32 can receive print data representing an image of a print target from the mobile terminal 100, and can send scan data obtained by scanning a document to the mobile terminal 100. Then, in a case where an operation for disconnecting the Wi-Fi connection with the MFP 10 is executed in the mobile terminal 100, the CPU 32 receives a disconnection request from the mobile terminal 100. Thereby, the Wi-Fi connection between the MFP 10 and the mobile terminal 100 is disconnected.

On the other hand, in S150, the CPU 32 causes the display unit 14 to display a WPS execution screen prompting the user to execute a WPS execution operation (i.e., the push button operation of the PBC scheme).

In S152, the CPU 32 determines whether an operation for executing the WPS (called "WPS execution operation" below) has been executed by the user. In a case where the WPS execution operation is executed by the user (YES in S152), the CPU 32 executes the processes of S140 to S148, and establishes a Wi-Fi connection with the mobile terminal 100. On the other hand, in a case where the WPS execution operation is not executed by the user (NO in S152), the CPU 32 ends the process of FIG. 4.

Further, in S160, the CPU 32 determines whether the Persistent information including the MAC address "BBB" of the mobile terminal 100 in the Invitation request (ON) received in 342 of FIG. 3 is being stored in the memory 34. The CPU 32 proceeds to S162 in a case of determining that the Persistent information is being stored in the memory 34 (YES in S160), or proceeds to S132 in a case of determining that the Persistent information is not being stored in the memory 34 (NO in S160). That is, in the case where the Persistent information is not being stored in the memory 34, the CPU 32 can execute the WPS process to establish a Wi-Fi connection with the mobile terminal 100 (S144).

S162, S164, S166 are the same as S140, S142, S148, respectively. In S168, the CPU 32 establishes a Wi-Fi connection with the mobile terminal 100 by using the Persistent information (i.e., the second wireless setting information) in the memory 34, without executing the WPS process. That is, by using the second wireless setting information in the memory 34, the CPU 32 can establish the Wi-Fi connection with the mobile terminal 100 without receiving the second wireless setting information from the mobile terminal 100. Since the WPS process is not executed, the Wi-Fi connection between the MFP 10 and the mobile terminal 100 is established quickly.

Although not shown, when S168 ends, the CPU 32 can execute communications of various data, such as print data and scan data, with the mobile terminal 100 by using the Wi-Fi connection established in S168 (i.e., by using the second WFDNW). Then, in a case where an operation for disconnecting the Wi-Fi connection with the MFP 10 is executed on the mobile terminal 100, the CPU 32 receives a disconnection request from the mobile terminal 100. Thereby, the Wi-Fi connection between the MFP 10 and the mobile terminal 100 is disconnected.

Figure 5:
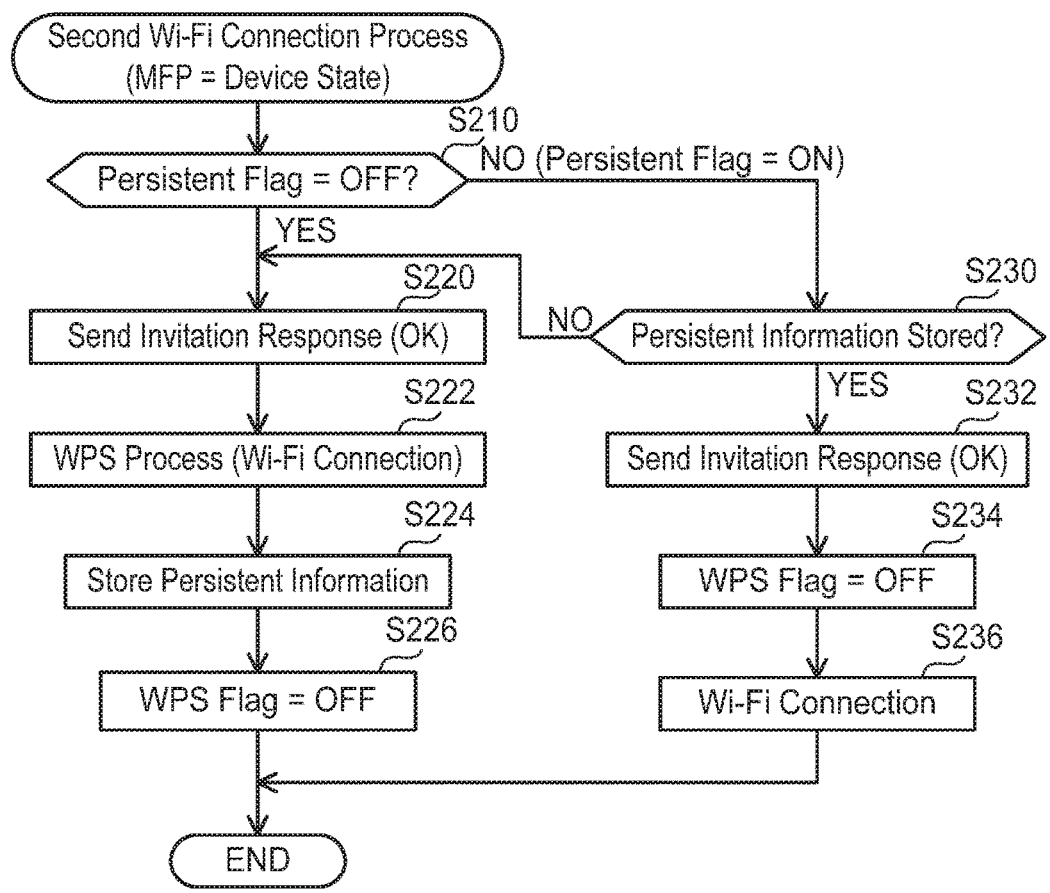
FIG. 5 shows a flowchart of a second Wi-Fi connection process.

(Second Wi-Fi Connection Process; FIG. 5)

Next, the second Wi-Fi connection process executed in S60 of FIG. 3 in a situation where the MFP 10 is in the device state will be described with reference to FIG. 5.

S210 is the same as S130 of FIG. 4. The CPU 32 proceeds to S220 in the case where the Persistent flag indicates "OFF" (YES in S210), or proceeds to S230 in the case where the flag indicates "ON" (NO in S210).

In S220, the CPU 32 sends an Invitation response including OK information indicating that the WPS process is executable, to the mobile terminal 100. S222, S224 are the same as S144, 8146 of FIG. 4. In S226, the CPU 32 changes the WPS flag 40 from "ON" to "OFF". When S226 ends, the process of FIG. 5 ends.

Further, S230 is the same as S160 of FIG. 4. The CPU 32 proceeds to S232 in the case of determining that the Persistent information including the MAC address "BBB" of the mobile terminal 100 is being stored in the memory 34 (YES in S230), or proceeds to S220 in the case of determining that the Persistent information is not being stored in the memory 34 (NO in S230).

In S232, the CPU 32 sends, to the mobile terminal 100, an Invitation response including OK information indicating that a Wi-Fi connection can be established by using the Persistent information. Then, in S234, the CPU 32 changes the WPS flag 40 from "ON" to "OFF".

In S236, without executing the WPS process, the CPU 32 establishes a Wi-Fi connection with the mobile terminal 100 by using the Persistent information in the memory 34 (i.e., the second wireless setting information). When S236 ends, the process of FIG. 5 ends.

Figure 6:
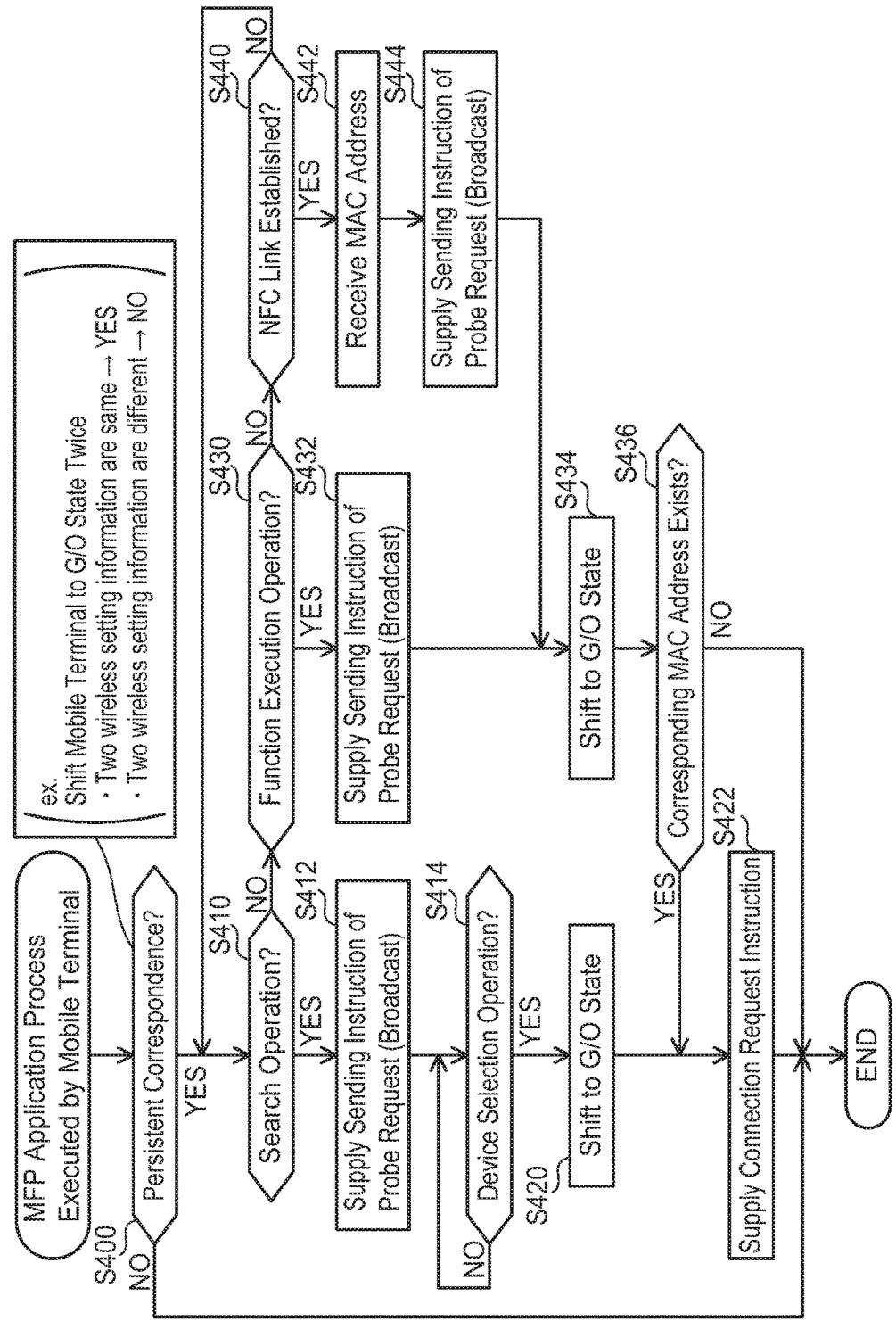
FIG. 6 shows a flowchart of an MFP application process executed by a mobile terminal.

(MFP Application Process Executed by Mobile Terminal 100; FIG. 6)

Next, contents of a process executed by the CPU 132 of the mobile terminal 100 in accordance with the application 138 will be described with reference to FIG. 6. In a case where an operation for activating the application 138 is executed on the terminal operation unit, the CPU 132 starts the process of FIG. 6. It should be noted, below, for the sake of convenience in the description, a subject of the process executed by the CPU 132 in accordance with the application 138, and a subject of the process executed by the CPU 132 in accordance with the OS program 136 are referred to as "application 138" and "OS 136", respectively, without referring to the CPU 132 as the subject.

In S400, the application 138 determines whether the mobile terminal 100 supports a Persistent function. The Persistent function is a function for, when a Wi-Fi connection is established, storing wireless setting information for establishing the Wi-Fi connection as the Persistent information, and thereafter re-establishing the Wi-Fi connection by using the Persistent information. The application 138 firstly shifts the operation state of the mobile terminal 100 from the device state to the G/O state of the WFD scheme. Thereby, the OS 136 generates wireless setting information to be used in a WFDNW in which the mobile terminal 100 operates as G/O. Next, the application 138 shifts the operation state of the mobile terminal 100 from the G/O state to the device state, and makes the WFDNW disappear. Next, the application 138 again shifts the operation state of the mobile terminal 100 from the device state to the G/O state of the WFD scheme. Thereby, the OS 136 again generates wireless setting information to be used in the WFDNW in which the mobile terminal 100 operates as G/O. Here, in a case where the Persistent function is supported, the OS 136 again generates the same wireless setting information as the firstly generated wireless setting information, and in a case where the Persistent function is not supported, the OS 136 generates wireless setting information different from the firstly generated wireless setting information. In the case where the same wireless setting information as the firstly generated wireless setting information is again generated, the application 138 determines that the Persistent function is supported (YES in S400), and proceeds to S410. On the other hand, in the case where wireless setting information different from the firstly generated wireless setting information is generated, the application 138 determines that the Persistent function is not supported (NO in S400), and ends the process of FIG. 6.

The process of S400 described above is executed only at a time of initial activation of the application 138, and in the case of determining NO in S400, the application 138 causes the display unit 114 to display a screen indicating that the application 138 cannot be used. Thereby, the user can know that the application 138 cannot be used, and normally does not activate the application 138 again. On the other hand, in the case of determining YES in S400, the application 138 proceeds to S410 without executing S400 even if the application 138 is activated again. It should be noted, even in a case where the process of FIG. 6 is not executed, the WPS process between the mobile terminal 100 and the MFP 10 is executed by the user operating the PBC scheme push buttons of the mobile terminal 100 and the MFP 10.

It should be noted, in a modification, the application 138 may determine whether the mobile terminal 100 supports the Persistent function based on version information of the OS program 136. For example, it may be determined that the mobile terminal 100 supports the Persistent function in a case where the version information is later than a predetermined version, and it may be determined that the mobile terminal 100 does not support the Persistent function in a case where the version information is same as or older than the predetermined version.

In S410, the application 138 monitors whether a search operation is executed on the terminal operation unit. The search operation is an operation for searching for a device capable of establishing a Wi-Fi connection with the mobile terminal 100. In a case where the search operation is executed, the application 138 acquires search operation information indicating that the search operation has been executed from the terminal operation unit (i.e., the operation unit 112 or the display unit 114), determines YES in S410, and proceeds to S412.

In S412, the application 138 supplies, to the OS 136, an instruction for sending a Probe request by broadcast. In this case, the OS 136 supplies the instruction to the Wi-Fi I/F 120. In response to sending of the Probe request, the OS 136 receives, from the MFP 10 via the Wi-Fi I/F 120, a Probe response including the MAC address "AAA" of the MFP 10, and the device name "XXX" of the MFP 10 or the SSID "YYY1" of the first WFDNW in which the MFP 10 operates as the parent station (i.e., as G/O). Then, the OS 136 supplies the MAC address and the device name or the SSID to the application 138.

In S414, the application 138 causes the display unit 114 to display the device name and the SSID acquired from the OS 136, and monitors whether a device selection operation for selecting one of the device name or SSID is executed on the terminal operation unit. The device selection operation is an operation for selecting a target device with which the mobile terminal 100 is to establish a Wi-Fi connection. In a case where the device selection operation is executed, the application 138 determines YES in S414, and proceeds to S420. The following process will be described taking, as an example, a case where the SSID "YYY1" of the first WFDNW is selected.

In S420, the application 138 shifts the operation state of the mobile terminal 100 from the device state to the G/O state. As a result, the OS 136 forms the second WFDNW in which the mobile terminal 100 operates as the parent station (i.e., as G/O), and generates the second wireless setting information (i.e., SSID "YYY2", "PPP2", etc.) to be used in the second WFDNW. It should be noted, in a modification, the application 138 may shift the operation state of the mobile terminal 100 from a state where SoftAP is not activated to a state where SoftAP is activated. In this case as well, a wireless network is formed in which the mobile terminal 100 operates as a parent station.

In S422, the application 138 supplies a connection request instruction to the OS 136. The connection request instruction includes an instruction for sending a Probe request including the MAC address "AAA" received together with the SSID "YYY1" selected in S414, and an instruction for sending an Invitation request. Upon acquiring the connection request instruction, the OS 136 supplies, to the Wi-Fi I/F 120, the instruction for sending the Probe request including the MAC address "AAA". The OS 136 receives a Probe response from the MFP 10 via the Wi-Fi I/F 120 in response to sending of the Probe request. Then, the OS 136 determines whether Persistent information including the MAC address "AAA" of the MFP 10 is being stored in the memory 134. In a case of determining that the Persistent information is being stored, the OS 136 supplies an instruction for sending an Invitation request including the Persistent flag "ON" to the Wi-Fi I/F 120, and in a case of determining that the Persistent information is not being stored, the OS 136 supplies an instruction for sending an Invitation request including the Persistent flag "OFF" to the Wi-Fi I/F 120. The OS 136 receives an Invitation response from the MFP 10 via the Wi-Fi I/F 120 in response to sending of the Invitation request.

Thereafter, the OS 136 executes a process for establishing a Wi-Fi connection with the MFP 10. For example, in the case where the Persistent information including the MAC address "AAA" of the MFP 10 is not being stored, the OS 136 executes the WPS process to establish a Wi-Fi connection with the MFP 10. In this case, the OS 136 stores, in the memory 134, the Persistent information including the MAC address "AAA" and the second wireless setting information generated in S420. Further, for example, in the case where the Persistent information including the MAC address "AAA" of the MFP 10 is being stored, the OS 136 establishes a Wi-Fi connection with the MFP 10 by using the Persistent information, without executing the WPS process. When S422 ends, the process of FIG. 6 ends.

Thereafter, although not shown, by using the Wi-Fi connection, the application 138 can send the function information request to the MFP 10 and receive the function information response from the MFP 10, and execute a communication of print data or scan data with the mobile terminal 100.

Further, simultaneously with the monitoring of S410, in S430, the application 138 monitors whether a function execution operation is executed in the terminal operation unit. The execution of the function execution operation is permitted on condition that a Wi-Fi connection with the MFP 10 has been established in the past. That is, the application 138 accept the input of the function execution operation on condition that the Persistent information including the MAC address "AAA" of the MFP 10 selected in S414 in the past is being stored in the memory 134. When the function execution operation is executed (YES in S430), the application 138 causes the display unit 114 to display a function execution screen. The function execution screen is a screen for selecting a function (e.g., print function, scan function) to be executed by the MFP 10. When a function is selected in the function execution screen, the application 138 acquires function selection information indicating that a function has been selected from the terminal operation unit (i.e., the operation unit 112 or the display unit 114), determines YES in S430, and proceeds to S432.

S432, S434 are the same as S412, S420, respectively. When S434 ends, in S436, the application 138 determines whether the MAC address "AAA" in the Persistent information is present in the MAC address in the Probe response received in S432. That is, the application 138 determines whether the Probe response has been received from the MFP 10. The application 138 proceeds to S422, in a case where the Probe response has been received from the MFP 10 (YES in S436). In S422 of this case, an instruction for sending a Probe request including the MAC address "AAA" in the Persistent information is supplied to the OS 136. On the other hand, in a case where the Probe response has not been received from the MFP 10 (NO in S436), the application 138 ends the process of FIG. 6 without executing S422. It should be noted, in a modification, the process of S436 may be executed by the OS 136 instead of by the application 138.

Thereafter, although not shown, the application 138 sends an execution request of the function selected in the function execution screen to the MFP 10 by using the Wi-Fi connection. For example, the application 138 sends print data to the MFP 10, and causes the MFP 10 to execute the print function. Further, for example, the application 138 sends a scan request to the MFP 10, causes the MFP 10 to execute the scan function, and receives scan data from the MFP 10.

Further, simultaneously with the monitorings of S410 and S430, in S440, the application 138 monitors whether an NFC link is established between the MFP 10 and the mobile terminal 100. In a case of acquiring establishment information indicating that an NFC link has been established from the NFC I/F 122, the application 138 determines YES in S440, and proceeds to S442.

In S442, the application 138 receives the MAC address "AAA" of the MFP 10 from the MFP 10 via the NFC I/F 122. S444 is the same as S412. When S432 ends, S434, S436, and S422 are executed, and the Wi-Fi connection with the MFP 10 is established. In S436 of this case, the CPU 32 determines whether the MAC address "AAA" received in S442 is present among the MAC addresses in the Probe response received in S444. Further, in S422 of this case, an instruction for sending a Probe request including the MAC address "AAA" received in S442 is supplied to the OS 136. When the Wi-Fi connection with the MFP 10 is established, in the same manner as above, the application 138 can use the Wi-Fi connection to send the function information request to the MFP 10, receive the function information response from the MFP 10, and execute a communication of print data or scan data with the mobile terminal 100.

(Specific Cases)

Next, specific cases A and B realized by the processes of FIG. 3 to FIG. 6 will be described with reference to FIG. 7, FIG. 8. In each of the figures, a thick arrow indicates an NFC communication, and a thin arrow indicates a Wi-Fi communication.

(Case A; FIG. 7)

Case A is a state after the process of FIG. 2 has been executed, that is, a state in which the Wi-Fi connection between the MFP 10 and the PC 200 is established, and the number of child stations participating in the first WFDNW in which the MFP 10 operates as the parent station has reached the upper limit. Further, the MFP 10 has already executed a Wi-Fi communication of print data, scan data, etc. with the PC 200. Further, the first predetermined time has elapsed since the last Wi-Fi communication between the MFP 10 and the PC 200 was completed. Further, there is no record that a Wi-Fi connection has been established between the MFP 10 and the mobile terminal 100, and Persistent information is not being stored either in the MFP 10 or in the mobile terminal 100. Further, the application 138 has already been installed in the mobile terminal 100, and it has been determined that the mobile terminal 100 supports the Persistent function (YES in S400 of FIG. 6).

When the user moves the mobile terminal 100 closer to the MFP 10 in T110, an NFC link between the MFP 10 and the mobile terminal 100 is established in T120 (YES in S10 of FIG. 3, YES in S440 of FIG. 6).

In T122, the MFP 10 sends the MAC address "AAA" to the mobile terminal 100 by using the NFC link (S12 of FIG. 3). Then, the MFP 10 determines that the PC 200 is participating in the first WFDNW as a child station (YES in S14), and changes the NFC flag 38 from "OFF" to "ON" (S16).

Upon receiving the MAC address "AAA" from the MFP 10 by using the NFC link in T122 (S442 of FIG. 6), the mobile terminal 100 sends a Probe request by broadcast in T130 (S444).

Upon receiving the Probe request from the mobile terminal 100 in T130 (YES in S30 of FIG. 3), in T132, the MFP 10 sends a Probe response including the MAC address "AAA" and the SSID "YYY1" to the mobile terminal 100 (S32).

Upon receiving the Probe response from the MFP 10 in T132 (S444 of FIG. 6), in T140, the mobile terminal 100 shifts to the G/O state (S434). Thereby, the mobile terminal 100 forms the second WFDNW, and generates the second wireless setting information (i.e., SSID "YYY2", password "PPP2", etc.) to be used in the WFDNW. Then, the mobile terminal 100 determines that the Probe response has been received from the MFP 10 (YES in S436), and in T150, sends a Probe request including the MAC address "AAA" to the MFP 10 (S422).

Upon receiving the Probe request from the mobile terminal 100 in T150, the MFP 10 sends a Probe response including the MAC address "AAA" and the SSID "YYY1" to the mobile terminal 100 in T152 (S40 of FIG. 3).

Upon receiving the Probe response from the MFP 10 in T152, the mobile terminal 100 determines that Persistent information including the MAC address "AAA" of the MFP 10 is not being saved, and sends an Invitation request (OFF) to the MFP 10 in T160 (S422 of FIG. 6).

Upon receiving the Invitation request (OFF) from the mobile terminal 100 in T160 (S42 of FIG. 3), the MFP 10 determines that the WPS flag 40 is "OFF" (YES in S44), and sends an Invitation response including NG information to the mobile terminal 100 in T162 (S110 of FIG. 4). Then, the MFP 10 determines that the PC 200 is participating in the first WFDNW as a child station (YES in S120), determines that a Wi-Fi communication with the PC 200 is not being executed (NO in S122), determines that the non-communication time is longer than the first predetermined time (YES in S126), and determines that there is a communication experience with the PC 200 (YES in S128). The MFP 10 determines that the Persistent flag is "OFF" (YES in S130), determines that the NFC flag 38 is "ON" (YES in S132), and in T170, sends a disconnection request to the PC 200. Thereby, the Wi-Fi connection between the MFP 10 and the PC 200 is disconnected in T172. Then, in T174, the MFP 10 stops the G/O state, changes the WPS flag 40 from "OFF" to "ON" (S140), and in T180, sends a Probe request including the MAC address "BBB" of the mobile terminal 100 to the mobile terminal 100 (S142).

Upon receiving the Probe request from the MFP 10 in T180, the mobile terminal 100 sends a Probe response to the MFP 10 in T182.

In T190, the WPS process is executed between the MFP 10 and the mobile terminal 100 (S144 of FIG. 4). Specifically, the MFP 10 receives, from the mobile terminal 100, the second wireless setting information including the SSID "YYY2" of the second WFDNW and the password "PPP2" of the second WFDNW. Then, in T192, communications of a 4-way Handshake and the like are executed between the MFP 10 and the mobile terminal 100, and a Wi-Fi connection is established (S144).

In T194, the MFP 10 stores Persistent information including the MAC address "BBB" of the mobile terminal 100 and the second wireless setting information received in T190 in the memory 34 (S146 of FIG. 4), and changes the NFC flag 38 and the WPS flag 40 to "OFF" (S148).

Further, in T196, the mobile terminal 100 stores Persistent information including the MAC address "AAA" of the MFP 10 and the second wireless setting information sent in T190 in the memory 134. Then, in T200, the mobile terminal 100 sends, to the MFP 10, a function information request for confirming functions executable by the MFP 10 by using the Wi-Fi connection, and in T202, receives a function information response indicating that the print function and scan function are executable from the MFP 10 by using the Wi-Fi connection.

In T210, the mobile terminal 100 sends a disconnection request to the MFP 10 by using the Wi-Fi connection, and in T212, receives a disconnection response from the MFP 10 by using the Wi-Fi connection. Thereby, in T220, the Wi-Fi connection between the MFP 10 and the mobile terminal 100 is disconnected.

(Case B; FIG. 8)

An initial state of case B is the same as the initial state of the case A. In the case B, the establishment of the Wi-Fi connection between the MFP 10 and the mobile terminal 100 is not triggered by the establishment of the NFC link, but instead the establishment of the Wi-Fi connection between the MFP 10 and the mobile terminal 100 is triggered by the search operation (YES in S410 of FIG. 6) being executed on the mobile terminal 100.

Figure 7:
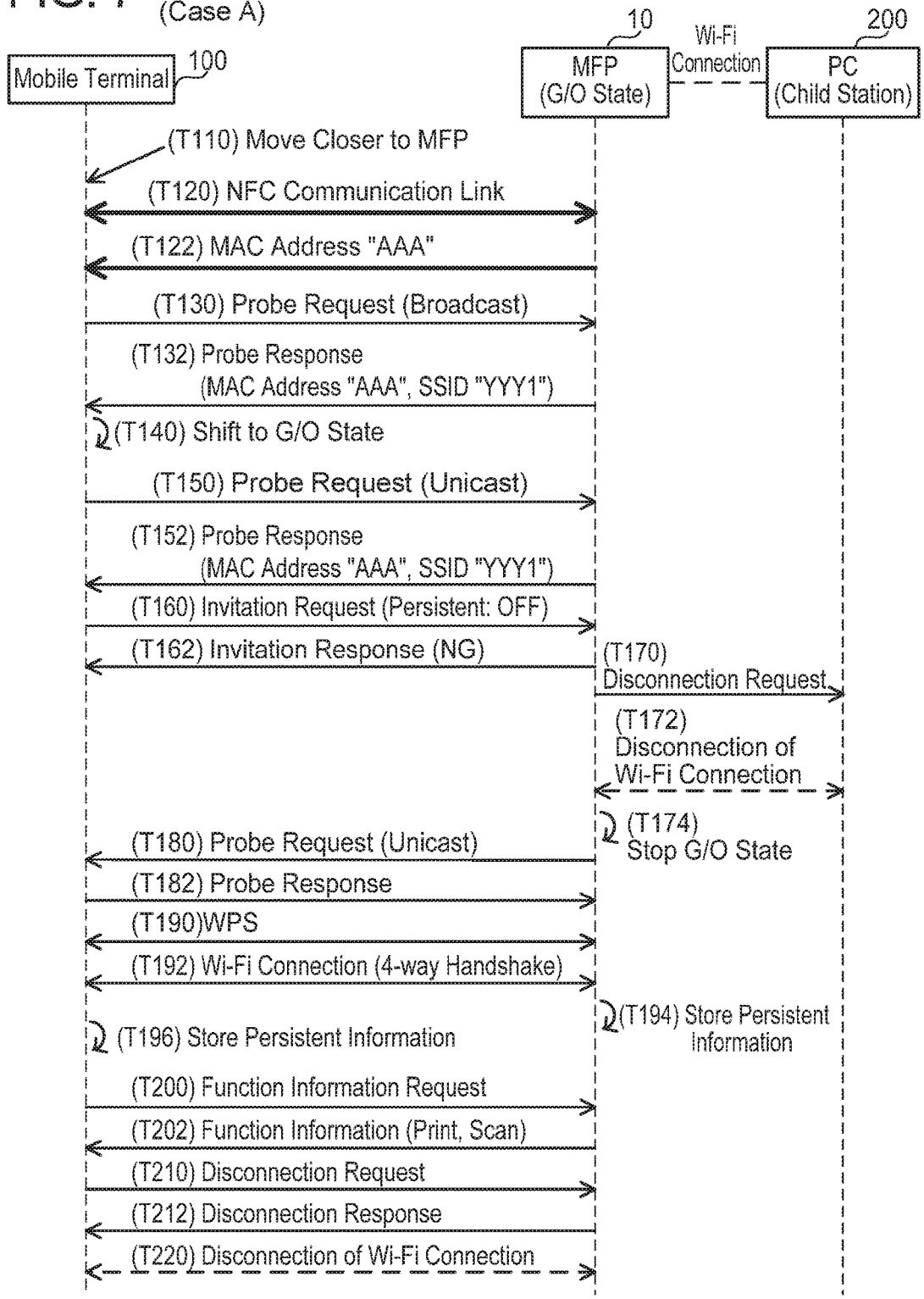
FIG. 7 shows a sequence diagram of a case A in which an NFC link is established between the mobile terminal and the MFP.
Figure 8:
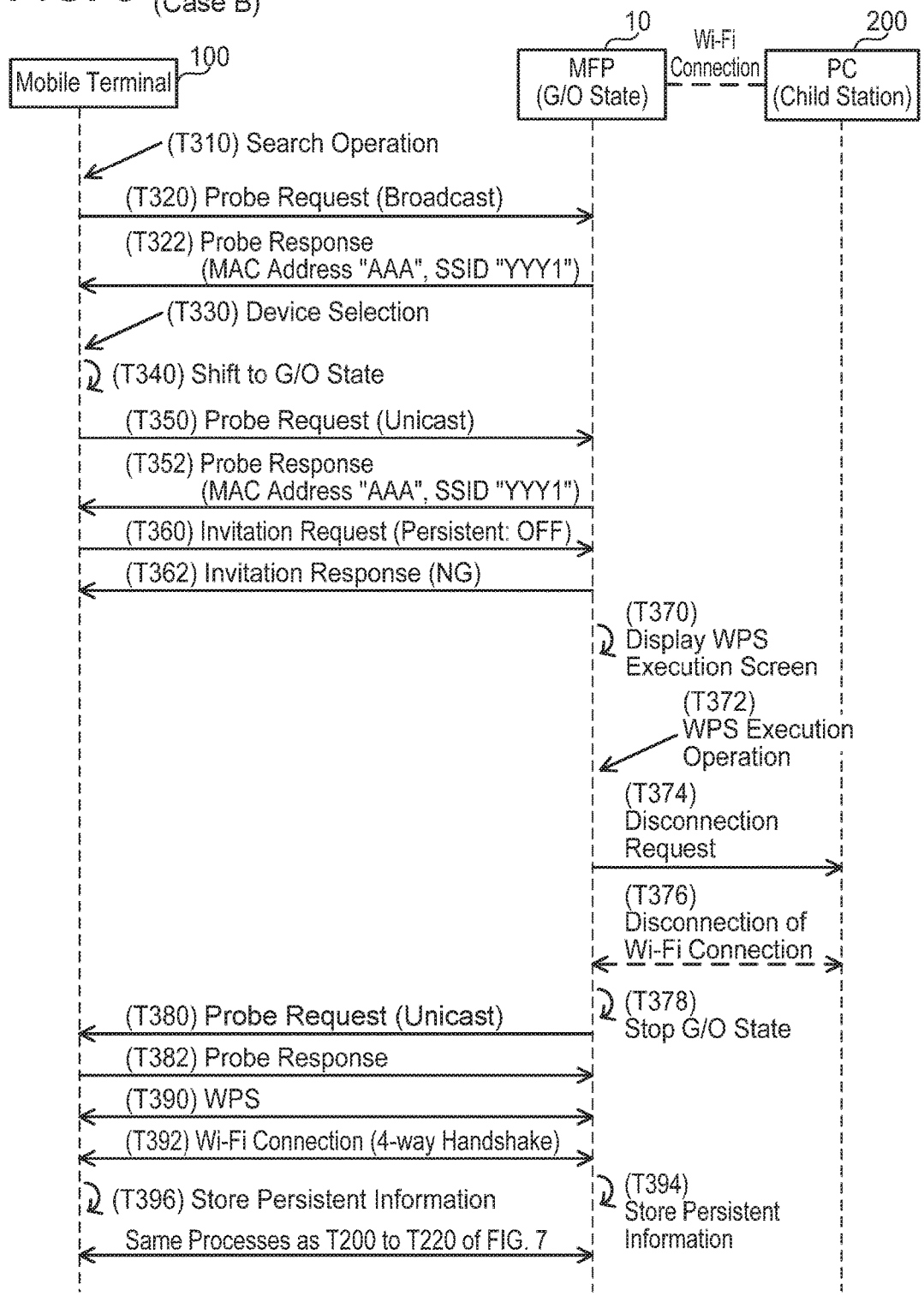
FIG. 8 shows a sequence diagram of a case B in which a search operation is executed on the mobile terminal.

When the search operation is executed on the mobile terminal 100 by the user in T310 (YES in S410 of FIG. 6), T320 and T322 are executed in the same manner as T130 and T132 of FIG. 7 (S30, S32 of FIG. 3, S412 of FIG. 6). Then, the mobile terminal 100 displays the SSID "YYY1" of the first WFDNW, and in T330, accepts selection of the SSID "YYY1" (YES in S414). T340 to T362 are the same as T140 to T162 (S40, S42 of FIG. 3, S110 of FIG. 4, S420, S422 of FIG. 5).

After having sent the invitation response indicating the NG information, in T370, the MFP 10 displays the WPS execution screen on the display unit 14 (S120 to S132, S150 of FIG. 4). Then, when the WPS execution operation is executed on the display unit 14 by the user in T372 (YES in S152), in T374, the MFP 10 sends a disconnection request to the PC 200, and in T378, stops the G/O state, and changes the WPS flag 40 from "OFF" to "ON" (S140). T380 to T396 are the same as 180 to 196 of FIG. 7.

Effect of First Embodiment

According to the present embodiment, in the case where an NFC communication with the mobile terminal 100 is executed (YES in S10 of FIG. 3) or in the case where a Wi-Fi communication is executed (YES in S30) under the state where the MFP 10 is operating as the parent station of the first WFDNW, the MFP 10 stops the G/O state, and shifts from the G/O state to the device state (S20 of FIG. 3, S140, S162 of FIG. 4). Then, after having shifted to the device state, the MFP 10 establishes, via the Wi-Fi I/F 20, the Wi-Fi connection with the mobile terminal 100 which is operating as the parent station of the second WFDNW (S144, S168 of FIG. 4, S222, S236 of FIG. 5), and participates in the second WFDNW as a child station. Consequently, instead of the state in which the MFP 10 operates as the parent station of the first WFDNW, the MFP 10 and the mobile terminal 100 can be caused to belong to the same second WFDNW. In particular, in the state where the number of child stations participating in the first WFDNW in which the MFP 10 operates as the parent station (i.e., as G/O) is equal to the upper limit ("1" in the present embodiment), the MFP 10 cannot cause the mobile terminal 100 to participate in the first WFDNW as a child station. According to the present embodiment, even in the state where the number of child stations participating in the first WFDNW in which the MFP 10 operates as the parent station is equal to the upper limit, the MFP 10 and the mobile terminal 100 can be caused to belong to the same second WFDNW since the MFP 10 shifts to the device state.

(Correspondence Relationships)

The MFP 10 and the mobile terminal 100 are examples of "communication device" and "external device", respectively. The NFC I/F 22 and the Wi-Fi I/F 20 are examples of "first wireless interface" and "second wireless interface", respectively. The NFC communication and the Wi-Fi communication are examples of "predetermined communication". The device state is an example of "specific state". The Wi-Fi connection established between the MFP 10 and the mobile terminal 100 is an example of "first wireless connection" and "second wireless connection". The NFC link is an example of "third wireless connection". The Invitation request is an example of "request signal". The WPS execution operation and the WPS execution screen are examples of "predetermined operation" and "predetermined screen", respectively. The first WFDNW and the second WFDNW are examples of "first wireless network" and "second wireless network", respectively.

Second Embodiment

Figure 9:
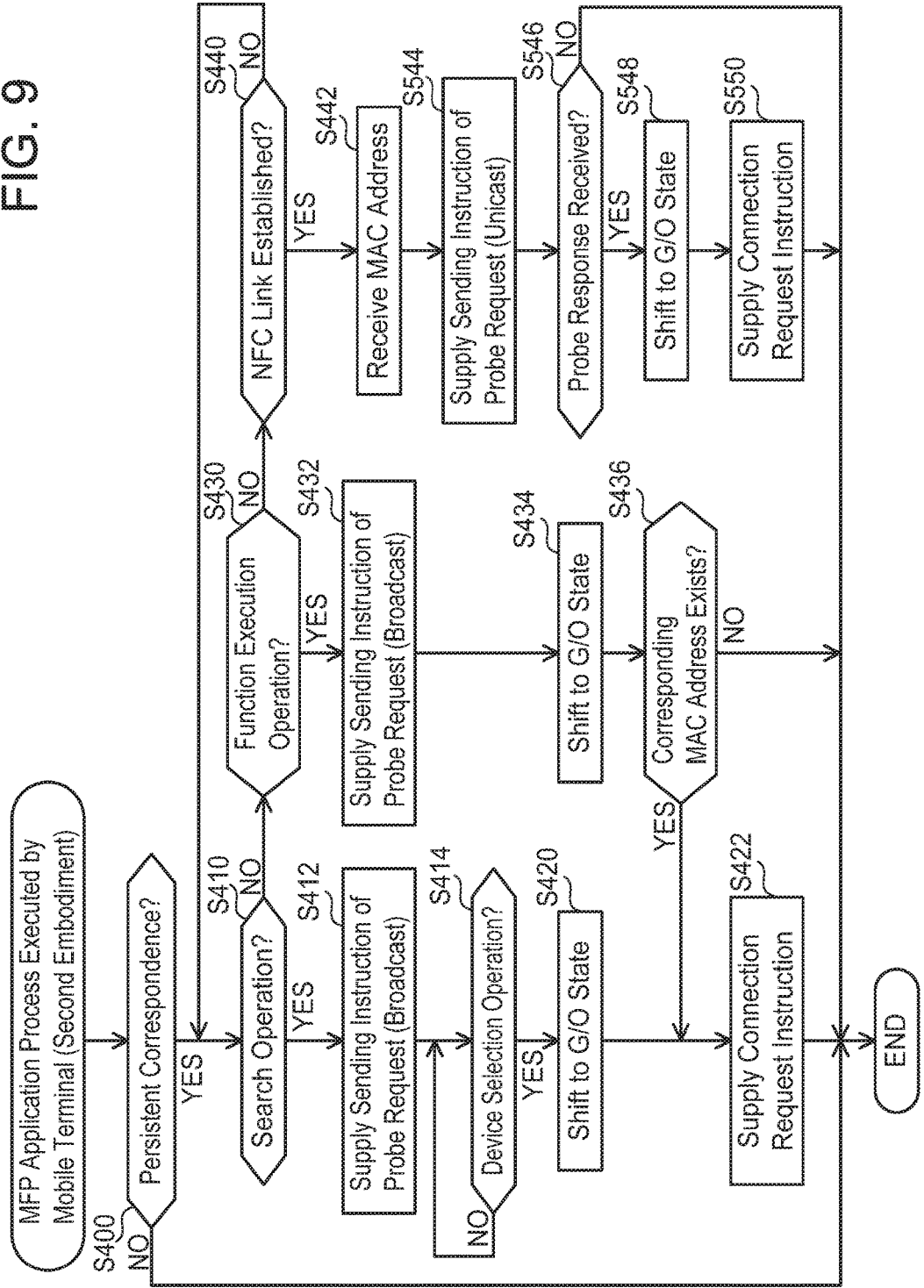
FIG. 9 shows a flowchart of an MFP application process executed by a mobile terminal of a second embodiment.

In the present embodiment, the process of FIG. 9 is executed instead of the process of FIG. 6. Specifically, determination of YES is made in S440, and S544 to S550 are executed after the execution of S442.

In S544, the application 138 supplies, to the OS 136, an instruction for sending a Probe request including the MAC address "AAA" received in S442 to the MFP 10. In this case, the OS 136 supplies the instruction to the Wi-Fi I/F 120. In response to sending of the Probe request, the OS 136 receives a Probe response from the MFP 10 via the Wi-Fi I/F 120. Then, the OS 136 supplies information indicating that the Probe response has been received to the application 138.

In a case of acquiring, from the OS 136, the information indicating that the Probe response has been received, the application 138 determines YES in S546, and proceeds to S548. S548, S550 are the same as S420, S422. However, a connection request instruction of S550 does not include an instruction for sending a Probe request, but includes only an instruction for sending an Invitation request. S550 differs from S420 in this point. On the other hand, in a case of not acquiring, from the OS 136, the information indicating that the Probe response has been received (NO in S546), the application 138 ends the process of FIG. 9 without executing S548 and S550.

(Modification 1) The upper limit of the number of child stations capable of participating in the first WFDNW in which the MFP 10 operates as the parent station may be "2" or more. In this case, if it is determined in S120 of FIG. 4 that two or more child stations are participating in the first WFDNW, the CPU 32 executes the processes below in S122, S126, S128. In S122, the CPU 32 determines NO in a case where a Wi-Fi communication is not being executed with any of the child stations, and determines YES in a case where a Wi-Fi communication is being executed with at least one of the child stations. Further, in S126, the CPU 32 determines YES in a case where a time that has elapsed since a Wi-Fi communication that the MFP 10 lastly executed with the child station(s) was completed exceeds the first predetermined time, and determines NO in a case where the elapsed time does not exceed the first predetermined time. Further, in S128, the CPU 32 determines YES in a case where there is a communication experience with every child station, and determines NO in a case where there is no communication experience with at least one child station.

(Modification 2) The mobile terminal 100 and the MFP 10 may be "communication device" and "external device", respectively. In this case, in a case where the NFC link with the MFP 10 is established under a state where the mobile terminal 100 operates as the parent station of the second WFDNW, the mobile terminal 100 stops the G/O state, and shifts from the G/O state to the device state. Then, the mobile terminal 100 establishes a Wi-Fi connection with the MFP 10 via the Wi-Fi T/F 120, and participates, as a child station, in the first WFDNW in which the MFP 10 operates as the parent station. Thereby, the MFP 10 and the mobile terminal 100 can belong to the same first WFDNW.

(Modification 3-1) The CPU 32 may stop the G/O state in a case of receiving an Invitation request from the mobile terminal 100 under the state where the number of child stations participating in the first WFDNW is equal to the upper limit, and may not stop the G/O state in a case of receiving an Invitation request from the mobile terminal 100 under a state where the number of child stations is less than the upper limit. In the latter case, the CPU 32 may cause the mobile terminal 100 to participate in the first WFDNW as a child station.

(Modification 3-2) The CPU 32 may stop the G/O state in a case of receiving an Invitation request from the mobile terminal 100 under a state where the number of child stations participating in the first WFDNW is zero, and may not stop the G/O state in a case of receiving an Invitation request from the mobile terminal 100 under a state where the number of the child stations is 1 or more.

(Modification 3-3) The present modification is a modification in which the upper limit of the number of child stations capable of participating in the first WFDNW in which the MFP 10 operates as the parent station is "2" or more. Further, below, a state in which the number of child stations is equal to the upper limit, a state in which the number of child stations is one or more and less than the upper limit, and a state in which the number of child stations is zero, are termed "first G/O state", "second G/O state" and "third G/O state", respectively. The CPU 32 may stop the G/O state in a case of receiving an Invitation request in one, or two or more of the first to third G/O states, and may not stop the G/O state in a case of receiving an Invitation request from the mobile terminal 100 in the other state(s) of the first to third G/O states.

(Modification 4) S120 to S128 may be omitted, and when S110 ends, S130 may be executed. In the present modification, "determine whether a wireless communication with any one of one or more child stations participating in the first wireless network is executed", "determine whether a non-communication time is longer than a predetermined time", and "determine whether a non-communication child station exists in one or more child stations participating in the first wireless network" may be omitted. Further, in another modification, one or more processes of S120 to S128 may be omitted. That is, when S110 ends, processes of S120 to S128 that are not omitted may be executed, and thereafter S130 may be executed.

(Modification 5) Regardless of the number of child stations participating in the first WFDNW, the CPU 32 may stop the G/O state before reception of an Invitation request in the case where the NFC link with the mobile terminal 100 is established (YES in S10). In this case, S14 of FIG. 3 can be omitted.

(Modification 6) S10 to S20 of FIG. 3 may be omitted. In this case, the MFP 10 may not comprise the NFC I/F 22.

(Modification 7) "First interface" may not be an I/F for executing an NFC communication, but may be, for example, an I/F for executing a wireless communication in accordance with another communication scheme such as BlueTooth (registered trademark), infrared, TransferJet, etc.

(Modification 8) "Communication device" may not be the MFP 10, but may be a printer capable of executing only a print function, a scanner capable of executing only a scan function, a PC, a mobile terminal, etc.

(Modification 9) In the above embodiments, the processes of FIG. 3 and FIG. 4 are realized by the CPU 32 of the MFP 10 executing the program 36 (i.e., software). Instead, at least one of the processes of FIG. 3 and FIG. 4 may be realized by hardware such as a logic circuit.

What is claimed is:

1. A communication device comprising:
a first wireless interface;
a processor; and
a memory storing computer-readable instructions therein, the computer-readable instructions, when executed by the processor, causing the communication device to:
shift an operation state of the communication device from a parent station state for operating as a parent station of a first wireless network to a specific state different from the parent station state, in a case where a predetermined communication with an external device not belonging to the first wireless network is executed under a first state where the communication device is operating as the parent station of the first wireless network; and
after the operation state of the communication device has been shifted to the specific state, establish a first wireless connection with the external device operating as a parent station of a second wireless network via the first wireless interface, so as to cause the communication device to participate in the second wireless network as a child station.

2. The communication device as in claim 1, wherein the first state is a state where the communication device is operating as the parent station of the first wireless network and a number of child stations participating in the first wireless network is equal to an upper limit.

3. The communication device as in claim 2, wherein the computer-readable instructions, when executed by the processor, further cause the communication device to:
in a case where the predetermined communication with the external device is executed under a second state where the communication device is operating as the parent station of the first wireless network and the number of child stations participating in the first wireless network is less than the upper limit,
shift the operation state of the communication device from the parent station state to the specific state; and
after the operation state of the communication device has been shifted to the specific state, establish a second wireless connection with the external device operating as the parent station of the second wireless network via the first wireless interface, so as to cause the communication device to participate in the second wireless network as a child station.

4. The communication device as in claim 1, wherein the computer-readable instructions, when executed by the processor, further cause the communication device to:
determine whether a wireless communication with any one of one or more child stations participating in the first wireless network is executed in the case where the predetermined communication with the external device is executed under the first state,
wherein the operation state of the communication device is shifted from the parent station state to the specific state in a case where it is determined that the wireless communication with any one of the one or more child stations is not being executed, and
the operation state of the communication device is not shifted from the parent station state to the specific state in a case where it is determined that the wireless communication with any one of the one or more child stations is being executed.

5. The communication device as in claim 1, wherein the computer-readable instructions, when executed by the processor, further cause the communication device to:
determine whether a non-communication time is longer than a predetermined time in the case where the predetermined communication with the external device is executed under the first state, the non-communication time being a time that has elapsed since a wireless communication with a last child station among one or more child stations participating in the first wireless network was completed, and the last child station being a child station among the one or more child stations with which the communication device executed a wireless communication lastly,
wherein the operation state of the communication device is shifted from the parent station state to the specific state in a case where it is determined that the non-communication time is longer than the predetermined time, and
the operation state of the communication device is not shifted from the parent station state to the specific state in a case where it is determined that the non-communication time is less than or equal to the predetermined time.

6. The communication device as in claim 1, wherein the computer-readable instructions, when executed by the processor, further cause the communication device to:
determine whether a non-communication child station exists in one or more child stations participating in the first wireless network in the case where the predetermined communication with the external device is executed under the first state, the non-communication child station being a child station which has not yet executed a wireless communication with the communication device after participating in the first wireless network,
wherein the operation state of the communication device is shifted from the parent station state to the specific state in a case where it is determined that the non-communication child station does not exist in the one or more child stations, and
the operation state of the communication device is not shifted from the parent station state to the specific state in a case where it is determined that the non-communication child station exists in the one or more child stations.

7. The communication device as in claim 1, wherein the predetermined communication includes receiving a request signal from the external device via the first wireless interface, the request signal being for requesting to participate, as a child station, in the second wireless network in which the external device operates as the parent station.

8. The communication device as in claim 7, further comprising:
a second wireless interface different from the first wireless interface,
wherein the operation state of the communication device is not shifted from the parent station state to the specific state in a case where a third wireless connection with the external device is established via the second wireless interface under the first state, and
after the third wireless connection with the external device has been established via the second wireless interface, the operation state of the communication device is shifted from the parent station state to the specific state in a case where the predetermined communication including the receiving of the request signal from the external device is executed under the first state.

9. The communication device as in claim 8, wherein
the computer-readable instructions, when executed by the processor, further cause the communication device to:
shift the operation state of the communication device from the parent station state to the specific state even if the predetermined communication including the receiving of the request signal from the external device is not executed, in a case where the third wireless connection with the external device is established via the second wireless interface under a third state where the communication device is operating as the parent station of the first wireless network and the number of child stations participating in the first wireless network is zero.

10. The communication device as in claim 7, further comprising:
a display unit; and
a second wireless interface different from the first wireless interface,
wherein the computer-readable instructions, when executed by the processor, further cause the communication device to:
display, on the display unit, a predetermined screen prompting to execute a predetermined operation for shifting the operation state of the communication device from the parent station state to the specific state, in a case where the predetermined communication including the receiving of the request signal from the external device is executed under the first state without a third wireless connection via the second wireless interface being established with the external device; and
shift the operation state of the communication device from the parent station state to the specific state in a case where the predetermined operation is executed by a user,
wherein after the third wireless connection via the second wireless interface has been established with the external device, the operation state of the communication device is shifted from the parent station state to the specific state without displaying the predetermined screen on the display unit, in a case where the predetermined communication including the receiving of the request signal from the external device is executed under the first state.

11. The communication device as in claim 1, wherein
the first wireless connection with the external device is established by executing a WPS (abbreviation of Wi-Fi Protected Setup) process with the external device via the first wireless interface after the operation state of the communication device has been shifted to the specific state.

12. A non-transitory computer-readable recording medium storing computer-readable instructions for a communication device,
wherein the computer-readable instructions, when executed by a processor of the communication device, cause the communication device to:
shift an operation state of the communication device from a parent station state for operating as a parent station of a first wireless network to a specific state different from the parent station state, in a case where a predetermined communication with an external device not belonging to the first wireless network is executed under a first state where the communication device is operating as the parent station of the first wireless network; and
after the operation state of the communication device has been shifted to the specific state, establish a first wireless connection with the external device operating as a parent station of a second wireless network via a first wireless interface of the communication device so as to cause the communication device to participate in the second wireless network as a child station.

13. A method executed by a communication device, the method comprising:
shifting an operation state of the communication device from a parent station state for operating as a parent station of a first wireless network to a specific state different from the parent station state, in a case where a predetermined communication with an external device not belonging to the first wireless network is executed under a first state where the communication device is operating as the parent station of the first wireless network; and
after the operation state of the communication device has been shifted to the specific state, establishing a first wireless connection with the external device operating as a parent station of a second wireless network via a first wireless interface of the communication device so as to cause the communication device to participate in the second wireless network as a child station.

* * * * *